United States Patent [19]

Vittorelli

[11] 4,056,821
[45] Nov. 1, 1977

[54] TEXTUAL PROCESSING SYSTEM UTILIZING DISPLAY AIDED ASSOCIATIVE SEARCHING FEATURE

[75] Inventor: Vittore Vittorelli, Ivrea (Turin), Italy

[73] Assignee: Ing. C. Olivetti & C., S.p.A., Ivrea (Turin), Italy

[21] Appl. No.: 675,399

[22] Filed: Apr. 9, 1976

[30] Foreign Application Priority Data

Apr. 29, 1975 Italy .................................. 68086/75
Apr. 18, 1975 Italy .................................. 67984/75

[51] Int. Cl.² .......................... G06F 3/12; G06F 3/14; G06F 7/28; G11B 27/02
[52] U.S. Cl. .................................................. 364/900
[58] Field of Search ..................... 340/172.5; 445/1; 197/19, 20; 364/200, 900

[56] References Cited

U.S. PATENT DOCUMENTS 3,815,104  6/1974  Goldman ........................... 340/172.5
3,913,721  10/1975  Koplow et al. ................... 340/172.5 X

*Primary Examiner*—Melvin B. Chapnick

*Attorney, Agent, or Firm*—Schuyler, Birch, Swindler, McKie & Beckett

[57] ABSTRACT

A textual processing system having a keyboard for entering textual information and for conditioning the system into a plurality of modes of operation including a search mode. The system also includes a record unit for recording and reading out textual information, on and from, respectively; a record medium; a printing unit for printing textual information; a display unit for displaying textual information; and a control unit connected to the above units. The control unit, during the search mode of operation, controls the record unit and the display unit for searching a group of textual information, entered from the keyboard, among the textual information stored on the record medium. The control unit displays the group of textual information entered from the keyboard and displays a predetermined fixed portion of the textual information containing the group of textual information found by the search. The group of textual information can be a reference word identifying the beginning of the particular text of the textual information stored on the record medium, a character identifying the end of the paragraph, or a group of words which are consecutive words of the stored text.

7 Claims, 8 Drawing Figures

TEXTUAL PROCESSING SYSTEM UTILIZING DISPLAY AIDED ASSOCIATIVE SEARCHING FEATURE

BACKGROUND OF THE INVENTION

This invention relates to an automatic typing system which includes a keyboard entering information to by typed, means for recording the entered information, a printing unit operable to print the recorded information and a display device which displays information entered from the entering means. The invention is concerned with the problem of enabling entered information to be amended.

In particular, the present invention relates to a particular device of the system by means of which it becomes very simple to amend a text previously recorded on the recording carrier. In automatic typing systems, the need very frequently arises for amending a text recorded previously both in order to eliminate errors and in order to change the text because of subsequent updatings thereof.

There are numerous automatic typing systems which comprise devices adapted to facilitate the search for the lines of the test to be amended for the purpose of accessing the lines containing an error.

One of these typing systems comprises a selector for selecting the part of the text to be amended on a magnetic tape. By means of the selector, a code associated with the text to be amended is introduced and a search for the text is thereafter commanded by means of a push button. The search for the text is made automatically and when the search has taken place, the typing system positions itself at the first line of the selected part of the text. If the operator wishes to correct an error appearing in the fourth line of the selected part, he actuates an appropriate push button three times and the push button produces the positioning of the system at the beginning of the fourth line. This positioning line by line may be optionally effected simultaneously with the printing of the lines themselves.

When the system is positioned at the beginning of the fourth line, the operator can command the printing word by word of all the words preceding the word which is wrong. At this point, the system is positioned at the word to be corrected, which can thus be altered.

This system, therefore, has the disadvantage of having to proceed line by line as far as the line to be amended and then proceed word by word as far as the word to be corrected. Corrections are, therefore, laborious and require a great amount of time to be carried out.

Another automatic typing system is, moreover, known wherein the search for the line to be altered is rendered faster owing to the fact that on recording of the text on a magnetic carrier it is divided into paragraphs by means of the recording of suitable check signals. When the operator wishes, for example, to correct an error contained in the fourth line of the third paragraph, he first commands the positioning of the system at the beginning of the third paragraph by actuating an appropriate key twice and then commands the positioning at the beginning of the fourth line as hereinbefore described.

This system, therefore, provides for division of the text into paragraphs. This division is effected by the operator in the recording stage by suitably recording two return-to-the-beginning characters at the end of each paragraph. This is made necessary by the fact that a single return-to-the-beginning character identifies the end of each line and, consequently, this character cannot be used singly to identify the end of a paragraph.

During the stage of searching for the successive paragraphs, the system recognizes the end of each paragraph by recognizing the pairs of carriage return characters recorded on the recording carrier. Moreover, the paragraphs are searched for one at a time. That is, if the operator intends to access the third paragraph, he actuates a first time a key which causes the positioning of the system at the first paragraph. Then the operator actuates the key a second time and the system positions itself at the second paragraph and, finally, he actuates the key a third time, positioning at the third paragraph being produced.

This typing system, therefore, has three disadvantages: a first operating disadvantage consists in the fact that, in order to identify the end of a paragraph, the operator must effect the introduction of a command (double return-to-the-beginning) which is usually not employed in typewriters. In fact, the end of a paragraph is normally commanded by means of a single return-to-the beginning command, so that the operator is very frequently made to forget to introduce the second command at the end of the paragraph.

A second operating disadvantage resides in the fact that the operator must wait for the search for each paragraph in order to command the search for the following one.

Another disadvantage is that of providing a suitable circuit for recognizing the double carriage return character during the search for the paragraph itself.

This system, therefore, also has the drawback of having to proceed paragraph by paragraph as far as the desired paragraph and thereafter line by line as far as the line to be amended. In short, this system also proves to be slow and complicated to use.

Finally, there is another typing system wherein the positioning at the beginning of the line to be amended can be commanded without necessarily having to proceed through the preceding lines. In fact, this system enables the beginning of each line to be accessed directly by using the initial word or words of the lines as search keys.

More precisely, if the operator wishes to position himself at the beginning of the line which commences with the word "system", he introduces this word by means of the keyboard and actuates an appropriate key. At this point, the typing system begins the search and stops when it finds the first line which begins with the word "system". Afther this, it proceeds word by word as far as the point to be amended.

Even if this typing system eliminates the disadvantage of having to proceed line by line or paragraph by paragraph as far as the line to be amended, it has the disadvantage of still requiring a further positioning operation starting from the beginning of the line as far as the point to be amended in the line. This disadvantage results from the fact that the text is recorded on the recording carrier already divided into lines, so that access to the various points of the text can take place only line by line.

Moreover, none of the described typing systems includes a visual display for visually displaying the contents of the recording carrier on which the text is recorded as far as the point at which the operator intends to insert the amendment. Such visual display is particularly useful, since it provides the operator with the possibility of scanning a section of the recording carrier as far as the desired point. In short, this visual display represents a "window" by means of which the operator can observe the contents of the recorded text immediately preceding the point at which he wishes to insert an amendment.

Therefore, where an automatic typing system is concerned, there exists the problem of accessing directly in a pre-recorded text the point which it is intended to amend, regardless of whether this point is at the beginning, at the end or in the middle of a line of typescript, and of visually displaying the recorded text as far as the point of insertion of the amendment, without having to apply special operative procedures during the recording of the text for identifying blocks of the text, or use special circuits for recognizing the beginning of the blocks.

SUMMARY OF THE INVENTION

Textual processing system employing a record unit, a control unit and a display unit. The record unit records and reads out textual information, on and from, respectively, a record carrier. The control unit is operable in a search mode for temporarily storing a group of characters entered from the keyboard. A reading operation is then performed whereby textual information is read from the record carrier while continually testing for a match between characters in that information and the temporarily stored group of characters. When a match occurs, the reading operation is terminated. The display unit operates continuously under control of the control unit to separately display the temporarily stored group of characters and the textual information read from the record carrier up to the last character read out.

BRIEF DESCRIPTION OF THE DRAWINGS

The invention will be described in more detail, by way of example, with reference to the accompanying drawings, in which:

FIG. 3a shows the circuit for access to any point of the text;

FIG. 3b shows the timing of a number of signals;

FIG. 3c shows further details of the circuit of FIG. 3a;

DETAILED DESCRIPTION OF THE PREFERRED EMBODIMENT

Figure 1:
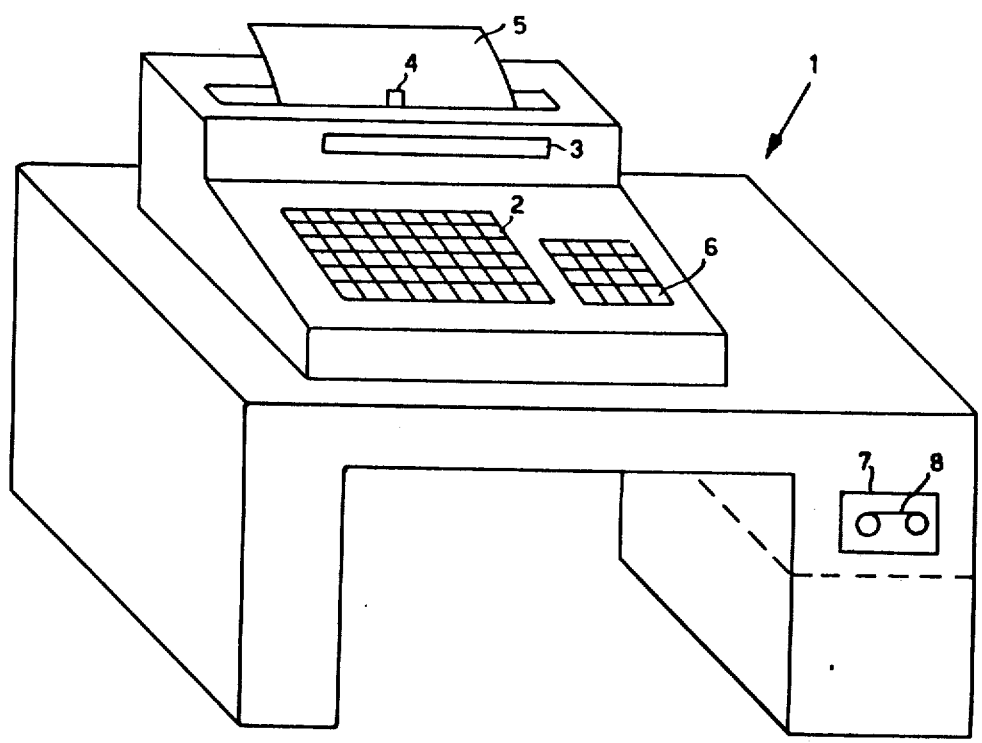
FIG. 1 is a perspective view of the console of a typing system embodying the invention.

Referring to FIG. 1, the console 1 of the typing system comprises an alphanumeric keyboard 2 of any known type used for typewriters, a visual display 3 for visually displaying the data introduced on the keyboard 2 and a printing unit 4 for printing the data on a sheet 5. The console also has a function keyboard 6 for introducing special commands into the system, a write/read station 7 for writing or reading the data on or from a magnetic carrier 8 (e.g. a tape cassette) indicated diagrammatically, and a control unit inside the console adapted to handle the processing and exchange of the data between the various devices constituting the typing system.

Figure 2:
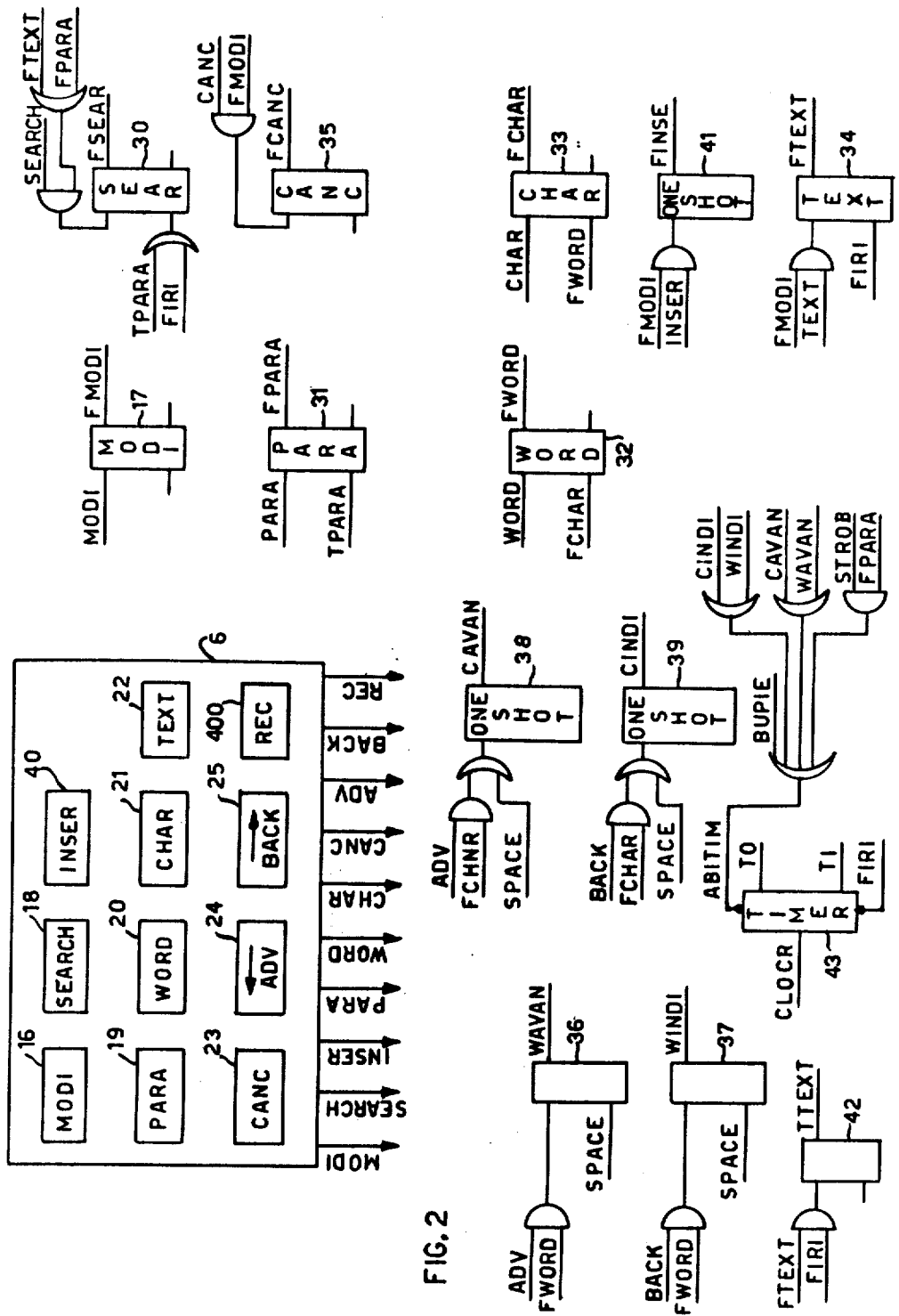
FIG. 2 shows the function keyboard and number of circuits of the typing system.

The function keyboard 6, which is used by the automatic typing system for recording a text and correcting a text already recorded on the recording carrier 8, is described with reference to FIG. 2. The function keyboard 6 comprises a set of keys each of which is connected to a microswitch not shown in the drawings which sends the signal on the corresponding wire connected thereto to logical "1" level.

More particularly, the key MODI-16 (instructing modifications) sends the direct set output FMODI of the flip-flop 17 to one by means of the signal MODI. This flip-flop is of the type known in the art as an R-S flip-flop (see the book Pulse, Digital and Switching Waveforms by Millman and Taub published by McGraw-Hill Book Company in 1965, chapter 10). Similarly, the keys SEARCH-18, PARA-19, WORD-20, CHAR-21, TEXT-22, CANC-23, FWD-24 and REV-25 send the set output of the respective flip-flops 30—37 to one. The key CHAR-21 moreover actuates two monostable (one shot) multivibrators 38 and 39. As can be observed, some of the flip-flops have at their activating or set input a signal which is the logical AND of two or more signals. This is done to enable the change over of the flip-flop only in the presence of certain conditions. For example, the flip-flop CANC-35 is enabled to change over only when the signal FMODI generated by the flip-flop MODI-17 is present. Semicircular outlines represent AND gates and crescent outlines represent OR gates.

The key REC-400 (instructing recording) is a bistable key which, when pressed a first time, is placed in an activated position and puts the signal on the wire REC to logical one level, and when pressed a second time is released and puts the signal on the wire REC to logical 0 level.

The key INSER-40 actuates a monostable multivibrator 41 which generates a signal FINSE the duration of which will be made clear hereinafter. FIG. 2 moreover shows a flip-flop 42 and a timer 43, which is enabled to generate two timing signals T0 and T1 by the signal ABTIM. The latter is the result of the logical OR of the various signals shown in FIG. 2. The phase displacement of the timing signals T0 and T1 will be explained better hereinafter.

The circuit for recording a text on the recording carrier 8 will now be described with reference to FIG. 6. The description will not go into detail since one of the methods of recording a text in this typing system is that described in my U.S. Pat. No. 3,940,746. Of course, the recording carrier may be of different type, for example a magnetic card or a flexible disc better known in the art as a "floppy disc".

Figure 6:
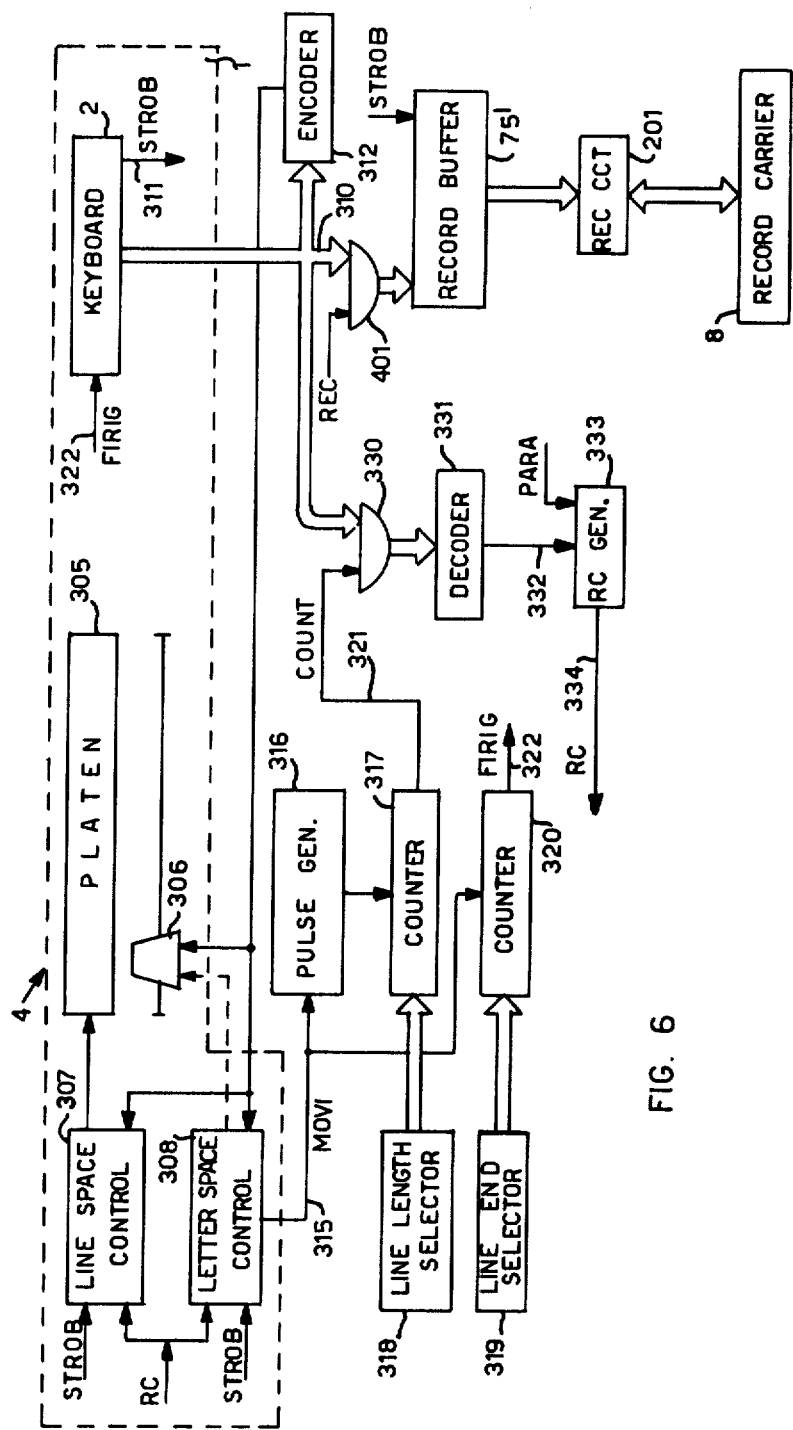
FIG. 6 is a logic diagram of a circuit for searching for paragraphs.

In FIG. 6, the printing section 4 comprises a platen 305, a printing head 306, a line-spacing control device 307 and a device 308 controlling the advance of the carriage (letter spacing). The keyboard 2 is not described in detail here, since it may be of any known type. For example, the keyboard 2 may be of mechanical type or of electronic type, the sole requirement being that it must generate on an output channel 310 a code corresponding to the character entered and on the wire 311 a signal STROB which is to indicate that a character has been entered.

The output 310 moreover controls a encoding device 312 for the characters entered, which commands in turn the selection of the character to be printed by the printing head 306. The latter may be of the stylus (wire printing type or of the ball type or of the disk type (daisy wheel) and in these cases it is movable on the carriage with respect to the platen 305, or it may be of the conventional hammer type and in this case the platen 305, which is mounted on the carriage, is movable with respect to the type basket. The line-spacing control circuit is such as to cause carriage return and to cause the platen 305 to rotate by an amount equal to the selected line-spacing step in consequence of a command RC for return to the beginning. Similarly, the circuit 308 controls the advance of the carriage on the entry of each character or in response to tabulation command, and the encoder 312 can also command line feed via the circuit 307 when required. In the event of the printing head 306 being of the type movable with respect to the platen, the circuit 308 may include, for example, a stepping motor which controls the movement of the printing head 306. The circuit 308 must supply at an output 315 a signal MOVI which indicates that the carriage has shifted by one step.

The output 315 of the circuit 308 is connected to a pulse generator 316 which decrements a counter 317 by one unit at each signal MOVI present on the output 315. The counter 317 can be loaded selectively with a numerical value which can be entered on a selector indicated diagrammatically at 318 but not shown in FIG. 1. The selector 318 is of any known type and is adapted to be actuated manually to enter a numerical value corresponding to the length of the printing line which it is intended to use during the recording of the text. When the operator intends to record a text, he puts the typing system into the recording state by pressing the key RECE, thus putting a signal at logical 1 level on the wire REC and sets the left-hand margin and the right-hand margin of the line on the printing unit 4. Usually, the left-hand margin is fixed by a margin stop; the right-hand margin, on the other hand, is fixed by entering on the selector 318 the number of characters which the line is to contain. Of course, if proportional spacing is used, the number of elementary spaces making up the line is entered on the selector 318. The pulse generator 316 decrements the counter 317, at each character entered on the keyboard 2, by a number of elementary steps equal to those occupied by the character entered, or by one in the case of non-proportional spacing.

In addition to the selector 318, a selector 319 is moreover provided by means of which a numerical value greater than that entered on the selector 318 is entered, so as to define an end-of-line zone the beginning and the end of which are defined in absolute value by the numbers entered on the selectors 318 and 319. A counter 320 is connected to the selector 319 in the same way as the counter 317 with respect to the selector 318 and is also decremented by the signal MOVI. When the two counters 317 and 320 are zeroized, they respectively generate on the wire 321 the signal COUNT, which is to indicate the beginning of the end-of-line zone, and on the wire 322 the signal FIRIG, which is to indicate the end of this zone. The way in which the end-of-line zone is used will be explained hereinafter.

The signal COUNT, together with the output 310 of the keyboard 2, constitute the inputs of an AND circuit 330, which is connected in turn to a decoder 331. The latter generates a signal HYSP on its output 332 when there is present at its input a character which encodes a space character or a character breaking up a word. Usually, this character is a hyphen or dividing dash.

The signal HYSP is applied to a circuit 333 generating the "return-to-the beginning" signal RC on its output 334 which commands the two control circuits 307 and 308 to effect return of the carriage of the printing element 306 to the beginning with line feed.

The system moreover comprises a record buffer 75' connected to the output 310 of the keyboard 2 through AND gates 401 controlled by the signal REC and then to the input of a recording circuit. The handling of the exchange of data between the keyboard 2 and the buffer 75' and between the latter and the circuit 201 is not described in detail since it does not constitute part of the invention.

The operation of the system according to FIG. 6 will now be described. Before beginning the recording of the text, the operator presses the key REC, which enables the AND gates 401, and then he defines the end-of-line zone by operating on the selectors 318 and 319, as has been seen. Let it be assumed, for example, that the zone is located between the 45th and the 50th characters. In this case, the contents of the counters 317 and 320 will be forty-five and fifty, respectively. The operator then begins to enter the characters of the first line on the keyboard 2. Each character is transmitted simultaneously to the buffer 75' for recording on the carrier 8, to the encoder 312 for printing, and to the AND gates 330, which remains inactive, however, as long as the signal COUNT is at level zero.

On the entering of each character, the pulse generator 316 decrements the counter 317 and by one unit or, in the case of proportional spacing, whatever value is appropriate. In this latter case the encoder 312 also controls, on the basis of the character entered, the advance of the carriage by an amount equal to the number of elementary spaces of which the character is composed.

When the counter 317 is zeroized, this means that the element 306 is at the beginning of the end-of-line zone and, consequently, the signal COUNT is at level 1 and the AND gates 330 are enabled. When, within this zone, the operator actuates a space or word-dividing (hyphen or dividing dash) key, the decoder 331 generates the signal HYSP, which causes the generation of the signal RC by the generating circuit 333. This signal controls the return of the carriage to the beginning with line feed, by means of the circuits 307 and 308.

In this way, the carriage is caused to return automatically to the beginning on actuation of a space or word-dividing character within the end-of-line zone. Actuation of the carriage return key at the end of each line as in ordinary typewriters is therefore avoided. At the same time, however, there is recorded on the recording carrier the character actually struck on the keyboard 2 (space or hyphen) and not the carriage return character which is transmitted only to the circuits 307 and 308.

In the case where the operator reaches the ultimate end of a line (signal FIRIG at logical "1" level) without actuating either the space key or the hyphen key, the keyboard is inhibited by the signal FIRIG. At this point the operator is warned that he can no longer proceed to enter characters and he, therefore, sees to the splitting of the current word. Of course, this case is a limit case inasmuch as it is possible to provide for utilizing the input signal COUNT in the end-of-line zone also for warning the operator by means of a sound or a lamp, so that he sees to splitting of the word before the ultimate end of the line. The following lines are entered in the same way.

When the operator finally decides to end the current paragraph, he actuates the return-to-the-beginning key directly. In this case, the actuation of the key is recognized by the encoder 312, which sends the respective character to the circuits 307 and 308 which control the return of the carriage. In the case of actuation of the return-to-the-beginning key, the result is, therefore, that return to the beginning is effected and at the same time the character RC is recorded on the recording carrier 8. This means that the character RC is recorded on the recording carrier only at the end of each paragraph, that is in correspondence with the deliberate actuation of the return-to-the-beginning key.

This advantage does not entail any working complication for the operator, since he is already accustomed a return-to-the-beginning by means of the corresponding key. Therefore, while the end of each line is commanded automatically by the machine, the end of a paragraph is commanded by the operator, but without his performing a special operation. In fact, in accordance with what has been said, the only way of commanding return to the beginning outside the end-of-line zone is to actuate the carriage return key.

From what has been said, it is moreover clear how the character RC recorded on the carrier 8 identifies the end of a paragraph and how the text corresponding to a paragraph is recorded on the carrier 8 without taking account of the division into lines, but as a single string of characters.

The device for searching for, and correcting, a recorded text will now be described with reference to FIG. 3a. This device comprises a character encoder 46 which is connected to the alphanumeric keyboard 2 and generates as output for each character struck a corresponding eight-bit code on the output channel 30 and the timing signal STROB on the wire 311. The channel 310 is connected via an AND gate 49 to a shift register 50 with a capacity of 16 characters and via an AND gate 51 and a channel 52 to a numeric decoder 53, which is adapted to generate when enabled, on a sixteen-bit output channel 54, a sequence of signals at logical 1 level equal in number to the numeric character present on the channel 52. For example, if the character "4" is present on the channel 52, the configuration "0000 0000 0000 1111" will be present on the output channel 54. The information present on the channel 52 is moreover sent via an AND gate 60 and a channel 61 to the visual display 3. The information present on the output 62 of the AND gate 49 is sent directly to the character cell 63, which constitutes the input cell of the shift register 50. The cell 63 is moreover connected to a character generator 64 which, when it is enabled by the signal present at the output of an AND gate 65, generates an eight-bit character which encodes the "carriage return" function code. The channel 62 is moreover connected via an AND gate 66 and an OR gate 67 to the input cell 68 of a second shift register 70. The output 71 of the register 70 is directly connected to a comparator 72 and via an AND circuit 73 and its output 76 to the visual display 3. The output 77 of the other shift register 650 is connected via an AND circuit 74 to a record buffer 75' connected to the recording circuit 201 adapted to write the information contained in the second buffer 75' on the recording carrier 8. This circuit 201 is not described because it may be of any known type; it is moreover described in U.S. Pat. No. 3,940,746.

The output 77 is moreover connected via an AND gate 75 to the comparator 72. The latter is adapted to compare the contents of the two registers 50 and 70 character by character and is adapted to generate a bit at logical 1 level at all its sixteen outputs $72_1 - 72_{16}$ if the contents of the corresponding cells of the two registers 50 and 70 are equal. Thus, if the contents of the two registers are identical, all the outputs of the comparator 72 will be at logical level. The outputs of the comparator 72 are connected to a sixteen-bit register 80. The first cell 81 on the right of the register 80 is connected via an AND circuit 82 to the input 83 of a sixteen-place counter 84. The input 83 is such that if a pulse is present thereon it decrements the contents of the counter 84 by one unit. Initially, the counter 84 contains all "0"s and can be loaded with a sequence of bits at logical 1 level in two different ways. When the signal FPARA is at logical 1 level, it is loaded with the sixteen bits present on the output 54 of the numeric decoder 53; in the example given hereinbefore, it will have the last four bits on the right at level "1" and all the others at level "0". When the signal FPARA is at logical "0" level, the counter 84 is loaded from the right via a gate 11 with as many bits at logical level as there are signals STROB generated by the keyboard encoder 46. It, therefore, contains as many consecutive bits (starting from the right) as there are characters entered on the keyboard 2. The sixteen outputs 89 of the counter 84 are connected to a sixteen-bit NAND circuit 90 with generates a signal at logical 1 level on its output 91 when the counter 84 is zeroized. When the signal FPARA is present, the signal on the wire 91 generates the signal TPARA. The outputs 89 of the counter 84 are connected to first inputs of a sixteen-bit AND circuit 93, the other inputs of which are constituted by the sixteen outputs 94 of the register 80. The AND circuit 93 carries out the logical AND of the corresponding outputs 89 and 94 and generates in turn a sixteen-bit character on the channel 95, which constitutes the logical AND of the outputs 94 and 89. More particularly, referring to the case where the contents of the counter 84 are "0000000000001111", the output from the AND circuit 93 will be a 16-bit character which will have the first twelve bits starting from the left at level 0 and the last four equal to the comparison made by the comparator 72. The AND circuit 93 is therefore used to eliminate from the comparison those bits which are not of interest. In fact, as will be better explained hereinafter, if it is desired to effect a search starting from a word of four characters, the word will be in the register 50 and the aforesaid configuration in the counter 84. Therefore, the outputs of the counter 84 and those of the AND circuit 93 will be equal only when the last four places starting from the left of the two registers 50 and 70 will have the same contents. This situation is detected by the exclusive-OR circuit 96 which, by way of a NAND circuit 97, generates an end-of-search signal FIRI.

The register 70 is loaded in two ways in dependence upon the logical level of the signal FSEAR. If this signal is at logical "0" level, it is loaded with the information entered on the keyboard 2 and present on the output 100 of the AND circuit 66. The shift frequency of the register 70 is given by the signal STROB, which is enabled to pass to the timing input 101 of the register 70 from an AND circuit 102. The signal STROB therefore causes the shifting of the contents of the register 70 to the left by one place and the introduction of the entered character into the first cell 68.

On the other hand, when the signal FSEAR is at logical "1" level, an AND circuit 105 is enabled and permits the loading of the register 70 with the information contained in a serializing register 106. The shift frequency of the two registers 70 and 106 is then given by the signal T0 generated by the timer 43 (FIG. 2), because an AND circuit 107 is now enabled. It is to be noted that the signal CAVAN enables an AND circuit 108 also to allow the signal T0 to pass as shift frequency. The serializer 106 is connected to a reading register 110 which is connected in turn to a reading circuit 200 adapted to read the data from the recording carrier 8. This device is of known type and is described in any case in the above mentioned U.S. Pat. No. 3,940,746. The technique of exchange of characters from the register 110 to the register 106 is not described in detail; however, this exchange will be mentioned briefly. When the register 106 is empty, it communicates this situation to the register 110, which supplies the new group of sixteen characters.

The contents of the last cell 111 on the left of the register 106, together with the contents of the first cell 68 on the right of the register 70 are transmitted to a decoder 120 in the presence of the signals enabling AND circuits 115 and 116, respectively. This decoder generates a signal SPACE if enabled by the signals WAVAN and WINDI when the contents of these cells are a space character.

The cell 68 of the register 70 is moreover connected to the cell 111 of the register 106 via an AND circuit 120' (FIG. 3c) which permits the shifting to the right of the characters from the register 70 to the register 106 when the signal WINDI or CINDI is present. These signals moreover enable an AND circuit 121 to allow the signal T0 to pass, which constitutes the shift signal.

When the shift to the right is effected, the characters overflowing from the register 106 can be stored in a backing register 125 to be then reintroduced into the register 106 on resumption of the shift to the left. This technique of connection between the registers 106 and 125 is not described in detail since it is known in the art.

The control unit of the visual display 3 will now be briefly described with reference to FIG. 4. An oscillator 130 generates a square wave having a frequency of 2 MHz. A timing generator 131 generates all the synchronism signals (including AGD10, COSAO, COSBO, PESHN) for the internal operations.

A first counter 132 generates the addresses of the individual cells of a store 133 in which the sixteen characters coming from the register 70 or the characters coming from the keyboard 2 are recorded. A counter 134 serves as a wait counter for generation of the line addresses of the display. This address, represented by four bits RIG10-RIG40, is generated by a counter 135. Moreover, the signals RIG10-RIG40 are used to address a ROM-136 adapted to generate the signals adapted to display the characters coming from the store 133 visually on the display 3. A logic network 137 provides for generating a special character code in the event of a character to be visually displayed coming from the store 133 not belonging to the visually displayable group (for example, a space character). The ROM-136 supplies seven blocks of five bits for each character to be visually displayed, which is therefore identified by a 5 × 7 dot matrix. These blocks are supplied to a serializer 138 which provides for filling a shift register 139 under the control of clock pulses from the timer 131.

A timer 140 generates the light-up signals for the seven lines of the display 3 through a decoding circuit 141 and amplifying line drivers 142. The display 3 is assumed to be of the kind in which each matrix point is at the intersection of a line electrode and a column electrode. The column electrodes are controlled by the contents of the buffer 139 to enable the correct matrix points as each of the seven lines is enabled in turn by way of the decoder 141.

Figure 4:
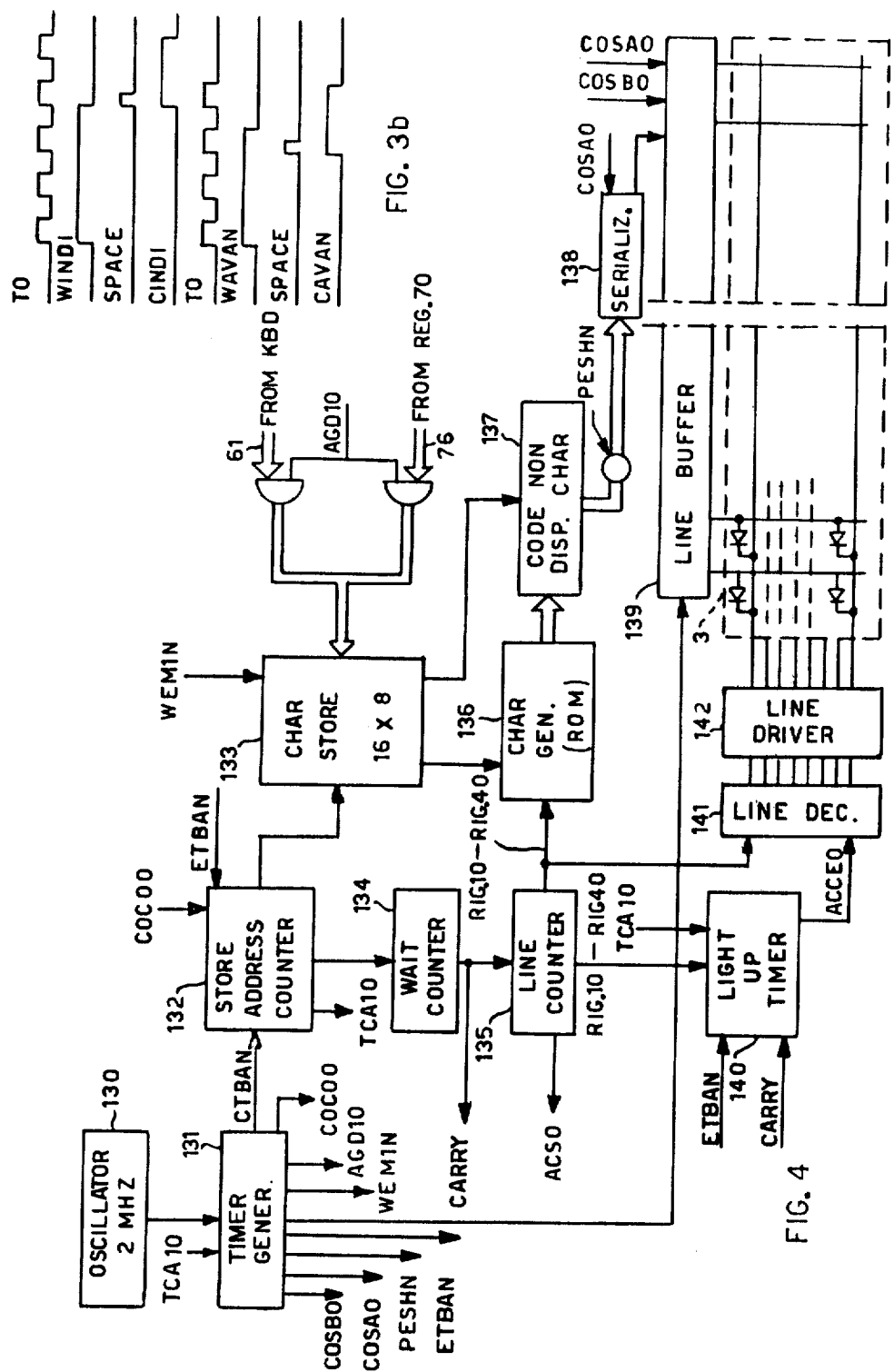
FIG. 4 is a block diagram of the controller of the visual display.

The operation of the circuit of FIG. 4 can be divided into three stages:

Stage 1: updating of data to be visually displayed (AGDIO=1, ETBAN=0).

This is characterised by the signal AGDIO generated by the timer generator 131 at logical one level, which enables the transfer to the store 133 of the characters contained in the register 70 or in the keyboard encoder 46. The timer 131 generates a signal WEM1N for writing in the store 133 and thereafter the signal COCOO for incrementing the addressing counter 132 of the store 133. When the counter has addressed the sixteenth cell of the store 133, it emits a signal TCA10 which commands the timer 131 to zeroize the signal AGD10 and to send a signal ETBAN to one.

Stage 2. Loading of line (AGDIO=0, ETBAN=1, ACCEO=0).

As has been said, in stage 1 the addressing of the store 133 is commanded by means of the signal COCOO. In stages 2 and 3, the incrementing of the three counters 132, 134 and 135 is commanded by means of the signal CTBAN coming from the timing generator 131. The signal ACCEO changes over to "0", thus inhibiting the lighting-up of the display 3.

The counter 132 addresses the store 133 at the character to be visually displayed starting from the first. This character is decoded by the ROM decoder 136. The eight bits of the store 133, together with the first three bits RIG10, RIG20 and RIG30 of the line counter, form an eleven-bit address for the ROM 136, which generates the character to be visually displayed. The output of the ROM 136 is constituted by five bits in which the bits at level "1" will light up the corresponding dots of the matrix of the visual display corresponding to the first line of the character read from the memory. For example, if the character H has been read from the memory, the output of the ROM 136 corresponding to the first line will be 10001.

The output of the ROM 136 is loaded into the serializer 138 by means of the signal PESHN. The output of the serializer 138 is connected to the shift register 139, which constitutes the line buffer.

The bits in the register 139 are shifted by the timing signals COSAO and COSBO. It is to be noted that the ROM 136 is connected to the serializer 138 via the logic network 137, which generates a special character code for all the code combinations which are not visually displayable. The store addresser 132 is incremented by one unit and the second location of the store 133 is read. The character generation cycle (ROM 136, circuit 137 and serializer 138) is repeated and supplies the new configuration of bit and until dots corresponding to the first line, second character. This configuration is again loaded into the line buffer 139 and the entire contents are shifted by five places. The above-described operations are repeated until the line buffer 139 is completely filled. At this point, the address counter 132 has assumed the configuration "1111". This causes the changeover to one of the signal TCA10, which conditions the circuit 140 to activate the signal ACCEO, which initiates the line lighting-up stage.

Stage 3. Lighting-up of a line (AGDIO=0, ETBAN=1, ACCEO=1). The signal ACCEO=1 enables the line decoder 141 (FIG. 4) to activate the driving circuits of the first line of the visual display 3. The dots of the sixteen positions of the visual display which will be illuminated are those corresponding to the bits of the line buffer at logical one level. The time taken by the counter 132 and by the wait counter 134 to reach the value 16 determines the period of the signal ACCEO. The signal ACCEO is zeroized when the line counter 135 changes its configuration because of the carry generated by the counter 134. The same operations are then repeated for the remaining lines inasmuch as the memory counter 132 is positioned at the cell 0000 of the register 133 and the line counter has been incremented by one by the carry of the wait counter 134. When the line counter reaches the value 7, it generates a signal ACSO which conditions the timer 131 to set the signal AGDIO=1 and a return is, therefore, made to stage 1.

Figure 5:
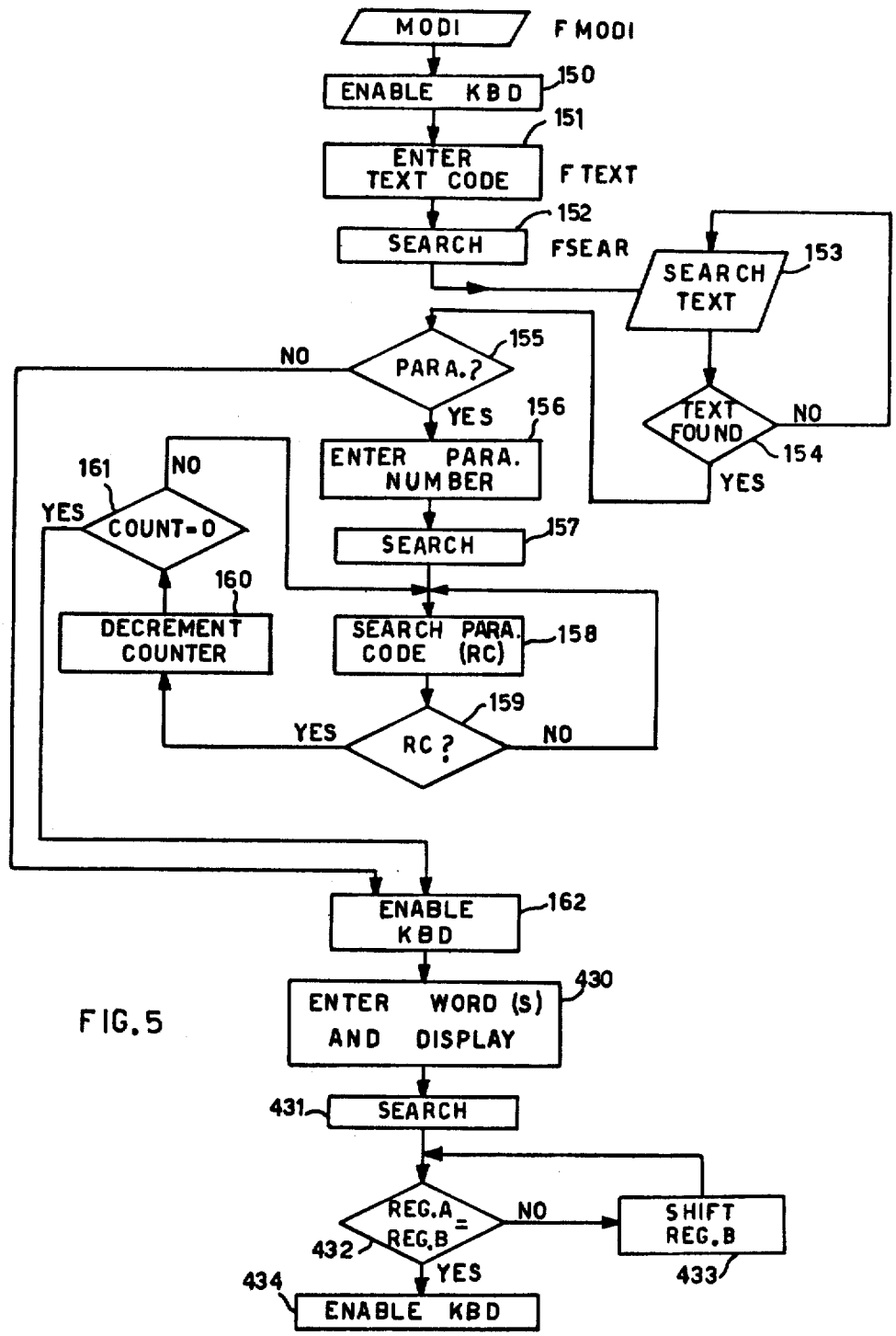
FIG. 5 is a flow design of the operations of the system.

The operation of the system embodying the invention will now be described with reference to the drawings already described and to the flow diagram of FIG. 5.

Let it be assumed that the operator has already recorded the text on the recording carrier 8 and that a reference code has been allocated to the text. At this point, the draft of the text is re-read by the author, who shows thereon the modifications or changes which he intends to make. The draft is then taken back by the operator for the purpose of inserting the changes on the record carrier 8. The operator inserts a sheet of paper 5 in the machine and inserts the record carrier 8 on which the text to be amended is recorded and then actuates the key MODI-16 of the function keyboard 6, whereby the flip-flop MODI-17 is activated. The output signal EMODI of this flip-flop enables the keyboard encoder 46; this is indicated diagrammatically by the block 150 of FIG. 5. After this, the operator actuates the key TEXT-22, which activates the flip-flop TEXT-34, and then the operator enters the text code (block 151) on the keyboard 2 and from here this code is recorded in the register 50. At the same time, the signal STROB generated on the striking of each character forces into the counter 84 via the AND circuit 11 as many bits at level 1 as there are characters which form the code of the text. Thereafter, the operator actuates the key SEARCH-18 (block 152), which activates the flip-flop SEAR-30. The output signal FSEAR of the latter commands the reading circuit 200 to fill the reading buffer 110. When the latter is full, the signal BUPIE enables the timer 43 to generate the signal T0 in accordance with a predetermined frequency. Each signal T0 causes the shifting to the left of one character of the contents of the register 106 and the transfer of the contents character by character to the register 70 (block 153). At each signal T0, the contents of the two registers 50 and 70 are compared by the comparator 72 and the result of the comparison is staticized in the register 81. Let it be assumed, for example, that the code present in the register 50 is the label "A001" formed by four characters. In this case, the characters "A001" will be recorded in the first four positions on the right of the register 50 and in the counter 84 there will be four bits at level 1 in the first four positions on the right and all zeros in the other positions. At each signal T1, the result is that the contents of the register 81 and the contents of the counter 84 (that is, 0000000000001111) are subjected to an AND operation by the AND circuit 93, so that the first twelve bits from the left will certainly be at level zero, while the last four on the right will be at level 1 if, and only if, the last four positions on the right of the register 70 contain the character "A001". The shifting of the characters to the register 70 continues precisely until this situation is encountered (logical decision 154). In fact, when the last four positions on the right of the register 70 contain the characters "A0001", there will be present at the output of the AND circuit 93, as has been said, the sixteen-bit character "0000000000001111", which is identical with the contents of the counter 84. For this reason, a character of sixteen bits all at level zero will be present at the output of the exclusive-OR circuit OREX96 and, consequently, the NAND circuit 97 generates the signal FIRI, which is to indicate that the search for the text is finished. The signal FIRI, together with the signal FTEXT, activates the flip-flop 42, the output TText of which is to indicate that the typing system is in the modification state (FMODI=1) and that the text has been found.

It is to be noted that in this situation the recording carrier is positioned with respect to the read/write device 200-201 at the beginning of the text to be modified or amended and that the last character of the code of the text is recorded in the cell 68 of the register 70.

It is to be noted, moreover, that the signal FIRI deactivates the flip-flops TEXT-34 and SEAR-30 and activates the flip-flop 12 (FIG. 3a) which generates the signal FIRIC. The signal FIRI, finally, inhibits the timer 43, so that the signals T0 and T1 are no longer generated and, consequently, the shifting in the registers 70 and 106 is blocked.

Finally, it is to be noted that during and shifting of the characters in the register 70 the signal FSEAR enables the AND circuit 75 to transmit the characters contained in the register to the controller of the visual display 3. In this way, during the search, the result will obtained that the visual display 3 displays the sixteen characters recorded on the recorded carrier 8 which precede the text to be amended. The operator will moreover have confirmation that the text has been found from the fact that in the last four places on the right of the visual display the code "A001" appears. In fact, even if the signal FSEAR inhibits the AND circuit 73, the contents of the register 70 have already been transferred to the register 133 of the controller of the visual display shown in FIG. 4.

A final observation is to be made in the event of the recording carrier containing a single text. This happens, for example, when the carrier is a magnetic card. In this case, it is no longer necessary to supply the code of the text, so that it is possible to do without the key TEXT-22, the flip-flop TEXT-34 and the flip-flop 42.

When the text has been found, the operator has two possibilities open to him: either to insert the changes or modifications directly, or to select a paragraph into which to insert the changes (logical decision 155). The choice naturally depends on whether the changes to be made are in the first paragraph or in the following ones.

Let it be assumed that the first change to be inserted is in the third paragraph. To select the beginning of the third paragraph, the operator actuates the key PARA-19 which activates the flip-flop PARA-31, which enables the AND circuits 13 and 82. The operator then strikes the number 2 on the keyboard 12 (block 156). This number is not recorded this time in the register 50, since the AND circuit 49 is inhibited, but is transmitted via the AND circuit 51 to the numeric decoder 53 and via the AND circuit 60 to the visual display 3. At the same time, the signal STROB which is generated after the striking of the number 2 by the encoder 46, together with the signal FPARA, enables the RC code generator 64 via the AND circuit 65; the latter forces into the cell 63 an eight-bit character which encodes the "return-to-the-beginning" character.

At the instant T0 following the signal STROB, the numeric decoder 53 decodes the number 2 and supplies on its sixteen outputs 54 the character "0000000000000011", which is stored in the counter 84 at the instant T1.

At this point, therefore, the position is that the "return-to-the-beginning" code is recorded in the cell 63 of the register 50, while two bits at level 1 are recorded in the last two cells on the right of the counter 84. In fact, as hereinbefore described, the text is recorded on the recording carrier 8 without taking account of the lines. The sole character relating to the format of the text which is recorded on the carrier 8 is the return-to-the-beginning character (RC) at the end of the paragraph.

At this point, the operator actuates the key SEARCH-18 (block 157), which, as has been shown, produces the start of the search (block 158). The characters read from the carrier 8 and recorded in succession in the register 70 are compared by the comparator 72 with the contents of the register 50 which, in this case, are only the character RC. When the comparator 72 detects equality between the contents of the cell 68 of the register 70 and of the cell 63 of the register 50 (logical decision 159), it activates the cell 81 of the register 80 via the wire $72_{16}$. The bit at level 1 generated in this way activates, via the AND circuit 82 previously enabled by the signal FPARA, the input 83 of the counter 84, which is shifted to the right by one cell, so that in the example by one cell, so that in the example given its contents become "0000000000000001" (block 160). The search continues to the next character RC found in the cell 68, and when the counter 84 is zeroized (logical decision 161), its outputs 89 condition the NAND circuit 90 to bring the signal on its output 91 to level 1. At this point, the signal TPARA is generated, which characterises the fact that the paragraph has been found that which deactivates the flip-flop PARA-31, so that the signal FPARA is at level 0.

At the point, the recording carrier 8 finds itself positioned at the beginning of the third paragraph and the character RC is recorded in the cell 68 of the register 70, so that this cell is located at the end of the paragraph preceding the searched-for paragraph.

From what has been said, it is clear that the case where the first amendment to be effected is in the first paragraph is a special instance of what has been explained, inasmuch as the typing system is already positioned at the beginning of the first paragraph. In any case, the keyboard 2 is enabled (block 162), so that the operator must now access the point of the paragraph at which he intends to make the amendment. One of the characteristics of the invention is indeed that of giving the operator the possibility of accessing any point whatsoever of a text even if this point is in the middle of a line.

To do this, the operator types on the keyboard the word or words preceding the word to be amended and these words are recorded in the register 50 (block 430). The operator then actuates the key SEARCH-18 (431) and the system begins to search for the words as hereinbefore described in the case of the search for the code of the text (block 433). When the word or words of the recorded text are the same as those entered by the operator, they are recorded in the cells of the register 70 which correspond to those of the register 50 in which the words entered by the operator are recorded, the search ends (signal FIRI at level 1) and the operator can insert the desired amendments (block 434). It is to be noted that at the end of the search the system is ready to receive amendments exactly at the point selected by the operator without further positioning operations having to be effected. This significant characteristic of the system stops the search precisely at the position of the point to be amended within the extent of the line, whereas all the other systems which are known permit positioning always and only at the beginning of a line.

According to another characteristic of the system, by acting on the keys ADV-24, BACK-25, CHAR-21 and WORD-20, the operator can shift the positioning forward and backward with respect to the point which has been searched for in this way. This is very useful, for example, if several amendments close to one another are to be made.

If the operator intends to proceed forward by character, he actuates the two keys ADV-24 and CHAR-21, if backward by character the keys BACK-25 and CHAR-21, if foward by word the keys ADV-24 and WORD-20 and, finally, if backward by word the keys BACK-25 and WORD-20.

In the first case, the monostable (one-shot) multivibrator 38 is activated and in the second case the monostable 39. In such case, a signal CAVAN (or CINDI) is generated which enables the AND circuit 105 (or 120'), which causes the shifting of a character in the register 70 to the left (or to the right). The duration of the two signal CAVAN and CINDI is such as to permit the shifting by a single place.

Figure 3:
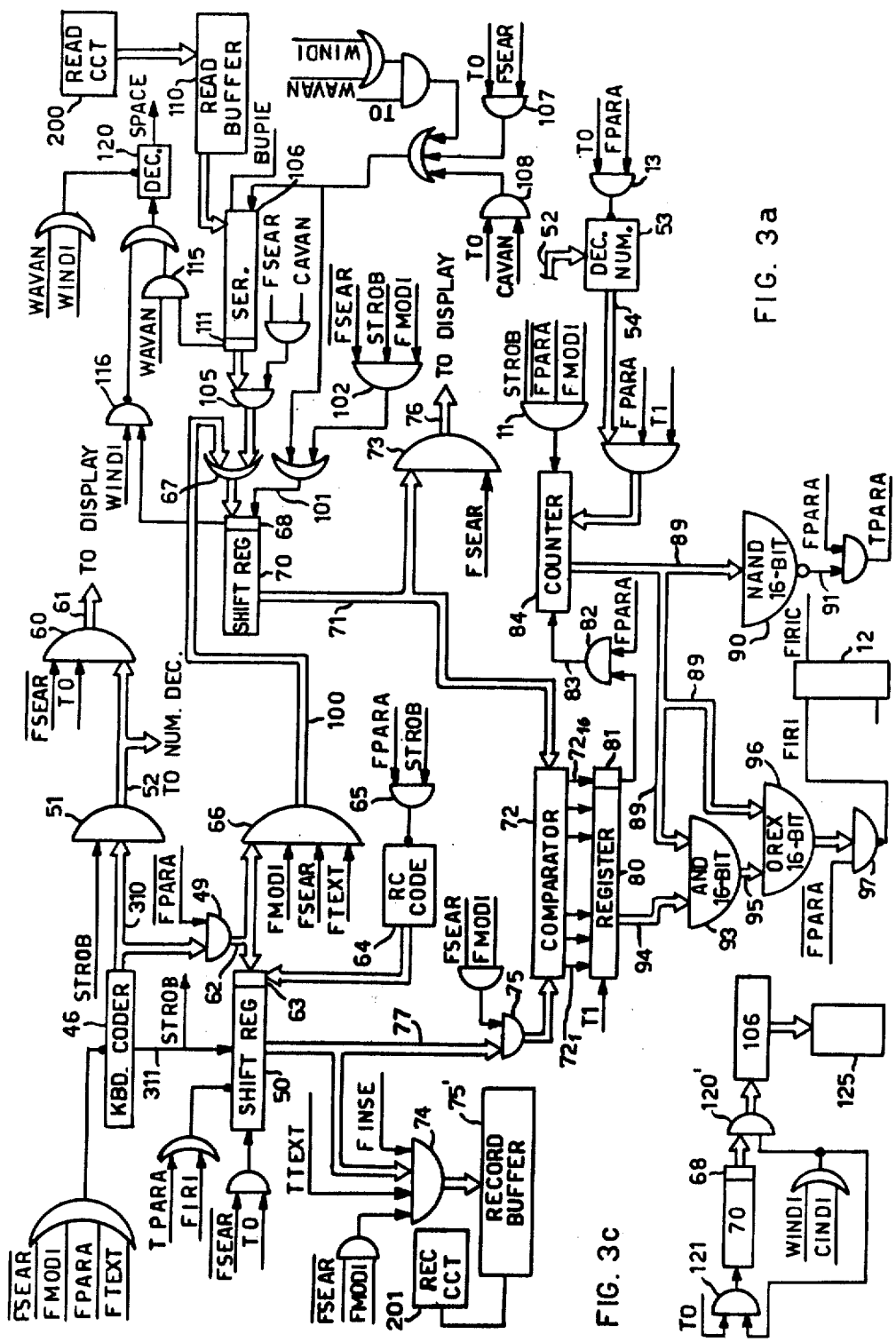

In the third case (words forward), the flip-flop 36 is activated and its output signal WAVAN enables the AND circuit 115, the decoder 120 and the conductor 101 (FIG. 3a). In this way, the shifting of the characters in the register 70 to the left is activated. When a space character is decoded by the decoder 120, the latter generates the signal SPACE, which deactivates the flip-flop 36, whereby the shifting ceases.

If the operator wishes to proceed again word by word, he acts a fresh on the keys WORD-20 and ADV-24 and the system proceeds forward again. Similar operations are performed if the shifting is backward and in this case the AND circuits 120' and 121 are enabled and produce the shifting to the right. FIG. 3b shows the course or form of the signals during these operations.

It is to be noted that the cell 68 of the register 70 assumes the significance of a positioning index from which the amendments can be inserted. This cell is associated with the first place or position on the right of the visual display 3, so that the operator also has visible information of the position in which he inserts the amendment.

It is to be noted, moreover, that also in the case of searching for the position in a paragraph and of the shifting by word or by character the visual display 3 evolves according to the contents of the register 70.

The changes which can be made starting from the position selected in this way are cancellation or deletion, addition, replacement or words or characters in accordance with the known techniques of automatic typing systems. By way of example, FIG. 2 shows the keys CANC-23 and INSER-40 for cancelling or inserting words or characters. The key CANC-23 could be used together with the key WORD-20 or CHAR-21 for cancelling a word at a time or a character at a time. The key INSER-40 could be used to insert one or more words starting from the selected point. In this case, a device may be provided in the writing device 201 for searching automatically on the carrier 8 for an area in which to record the insertion and for then effecting automatic link-up between the insertion and the previously recorded text.

There will now be described a number of modifications which could be used as an alternative to the system which has just been described. Instead of the code of the text to be amended being entered from the keyboard 2, it could be entered by means of a numeric selector formed, for example, by a numbered thumb wheel or the number of the paragraph could also be entered by depressing the key PARA-19 as many times as there are paragraphs which it is intended to skip. In this case, each actuation of the key can increment the counter 84 by one. The capacity of the registers 50 and 70 and, consequently, of the visual display 3 could be different from that described (greater or smaller). At the selected point of the paragraph, there could be recorded a function command in addition to an amendment information item. Other modifications could moreover be introduced without, on the other hand, departing from the scope of the invention, which enables selection of any point of the text for the purpose of inserting either amendments or function information, such as printing stops, etc. The selection of the point takes place irrespective of its position within the limits of the line, inasmuch as the text is considered as a single string of characters and not line by line. Moreover, the whole of the recorded text as far as the desired point is displayed via the 16-character window of the visual display, evolves according to the contents of the recording carrier. Finally, it is to be noted that the operative mode of modification or amendment (FMODI=0) is deactivated on actuation of any key of the function keyboard 6 corresponding to another operative mode, for example the printing of the amended text. Actuation of one of the function keys produces the deactivation of the flip-flops MODI-17, 42, CANC-35 and 12.

As has been noted above, no end of line characters are recorded (except at the end of a paragraph). Therefore, when printing out from the record carrier the system has to format the text in lines. This it does utilizing the circuitry of FIG. 6 to generate RC just as when the text is initially entered from the keyboard. This means that the division of the text into lines will in general be different in the final print-out as compared with the original entry and a particular advantage of this is that the system thereby automatically adapts to any insertions or deletions which have been made. Indeed, there is no reason why the selectors 318 and 319 should not be set for a different line length when printing from the record carrier than when initially typing in the text.

What I claim is:

1. A textual processing system comprising:
    a keyboard having a plurality of symbol printing keys providing alphanumeric printing signals;
    a record mode signal means for conditioning the system into a record mode of operation;
    a search mode signal means for conditioning the system into a search mode of operation;
    a start search signal means for providing a start search signal which commences the search mode of operation;
    a control unit connected to said keyboard and including; temporary storage means having a plurality of storage locations, each location having a capacity of storing the alphanumeric printing signals corresponding to alphanumeric print symbols;
    a record unit connected to said control unit including: means for recording the alphanumeric printing signals on a recording medium from said temporary storage means, means for reading said signals from the recording medium into said temporary storage means, and drive means for moving the recording medium;
    type means operable in response to said alphanumeric printing signals to print corresponding alphanumeric symbols in a line;
    a display unit connected to said control unit and receptive of the alphanumeric printing signals from said temporary storage means for displaying corresponding alphanumeric symbols, said display unit having the capacity of displaying a maximum predetermined number of alphanumeric symbols; and
    said control unit further including: first operating means enabled in said record mode to operate said recording means and said drive means to sequentially record onto the recording medium the alphanumeric printing signals as sequentially entered from said keyboard,
    storing means enabled in said search mode for storing a group of alphanumeric printing signals entered from said keyboard and not exceeding in number said maximum predetermined number, into a first section of said temporary storage means,
    second operating means enabled in said search mode for operating said display unit to display the symbols corresponding to the signals stored in said first section of said temporary storage means,
    first means responsive to said start search signal for operating said reading means and said drive means for sequentially shifting the signals read from the recording medium into a second section of said temporary storage means, each location of said first section being in correspondence with a location of said second section,
    comparing means enable in said search mode upon reception of said start search signal for continuously comparing, during the operation of said reading means, the alphanumeric printing signals stored in the location of said first section of the temporary storage means with the signals stored in the corresponding locations of said second section of the temporary storage means, and for generating a match signal when a match occurs,
    second means responsive to said match signal for terminating the operation of said reading means and said drive means, and
    third means responsive to said match signal for operating said display unit to display the entire content of said second section of said temporary storage means.

2. A textual processing system according to claim 1, wherein said keyboard further comprises means for generating advancing or stepping back signals for the record medium, wherein advancing or stepping back of the record medium occurs in selected amounts; and, said control unit further comprises:

third operating means enabled in said search mode and responsive to said advancing or stepping back signals for operating said drive means to advance or step back, respectively, the record medium in selected amounts.

3. A texual processing system according to claim 1, wherein said alphanumeric printing signals make up a word or group of words of a text previously stored on said recording medium.

4. A textual processing system comprising:
a keyboard for entering textual information comprising alphanumeric characters;
a recording device operable for storing the textual information entered from the keyboard, into a record medium;
a reading device operable for reading the textual information stored in the record medium;
a printing device receptive of textual information selectively from said keyboard and from said reading device for printing corresponding lines of text;
conditioning means for selectively conditioning the system into a plurality of modes of operation including a record mode of operation and a search mode of operation;
a control unit having means enabled in said record mode for operating said recording device and said printing device to print the information entered from said keyboard;
searching means enabled in said search mode to search for a word or group of words entered by said keyboard among the textual information stored in said record medium; and,
the system further comprising: a first register for temporary storing said word or group of words, having the capacity of storing a predetermined number of alphanumeric characters,
a display unit having a capacity of displaying a number of alphanumeric characters, not less than said predetermined number,
connecting means for connecting said display unit to said first register for displaying said word or group of words as they are entered from the keyboard,
a shift register including in said searching means, having the capacity of storing a number of characters not less than the capacity of said display, for sequentially storing the character read from the record medium by said reading device,
comparing means included in said searching means for continuously comparing the group of alphanumeric characters stored in said first register with the textual information stored in a corresponding portion of said shift register and for generating a match signal when a match occurs,
first means responsive to said match signal for terminating the operation of said reading device,
and second means resonsive to said match signal for connecting said display to said shift to display its contents.

5. A textual processing system comprising:
a keyboard having a plurality of symbol printing keys providing alphanumeric printing signals including a space key and a hyphen key;
a key providing an end of paragraph signal;
a record mode signal means for conditioning the system into a record mode of operation;
a control unit connected to said keyboard having a temporary storage means for storing said alphanumeric printing signals;
a record unit connected to said control unit including:
recording means for recording alphanumeric printing signals on a record carrier from said temporary storage means,
reading means for reading said signals from the record carrier into said temporary storage means,
a printing unit connected to said control unit receptive of printing signals entered from said keyboard for printing alphanumeric symbols corresponding to said signals on a printing line and including means defining an end of line zone for the printing line,
and a carriage return apparatus and,
said control unit further comprising: first detecting means enabled in said record mode for detecting the entry from said keyboard of printing signals corresponding to a space signal or a hyphen signal within said end of line zone and for generating a corresponding first control signal,
second detecting means, enabled in said record mode, for detecting the entry from said keyboard of said end of paragraph signal, and for generating a corresponding second control signal,
actuating means, operable in said record mode and responsive to said first or second control signal, for actuating said carriage return apparatus,
and first storing means, operable in said second mode and responsive to said second control signal, for storing a signal corresponding to said end of paragraph into said temporary storage means.

6. A text processing system according to claim 5, further comprising:
a search mode signal means for conditioning the system into a search mode of operation;
and, wherein the control unit further comprises: second storing means enabled in said search mode for storing a numeric signal entered from the keyboard indicating the serial number of a paragraph within a predetermined text stored on said record carrier,
controlling means enabling said search mode upon entry of said numeric signal for controlling said reading means to read said predetermined; text stored on said record carrier,
third detecting means enabled in said search mode for detecting each end of paragraph signal read out from the record carrier and for generating a third control signal upon detection thereof,
counting means for counting each said third control signal
and comparing means for comparing the contents of said counting means with said stored numeric signals and for disabling the operation of said reading means when a match occurs.

7. A textual processing system according to claim 5, further comprising:
a search mode signal means for conditioning the system into a search mode of operation;
a register for storing in said search mode of a numeric signal entered from the keyboard and indicating the serial number of a paragraph within a predetermined text stored on said record carrier;
controlling means enabled in said search mode upon entry of said numeric signal for controlling said reading means to sequentially read out said predetermined text stored on the record carrier;
third detecting means enabling said search mode for detecting each end of paragraph signal read out from the record carrier during the operation of said reading means, for generating a third control signal upon detection thereof;

decrementing means responsive to each of said third control signal for decrementing the content of said register; and disabling means responsive to the contact of said register for disabling said reading means when the content of said register decrements to a predetermined value.

* * * * *